United States Patent
Tsujimura et al.

(10) Patent No.: US 7,327,265 B2
(45) Date of Patent: Feb. 5, 2008

(54) RF TAG READER/WRITER AND PRINTER CONTAINING THE RF TAG READER/WRITER

(75) Inventors: Hisashi Tsujimura, Shizuoka (JP); Nobuo Murofushi, Susono (JP); Hiroshi Morishima, Kawasaki (JP); Seiichiro Yarita, Tochigi (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 262 days.

(21) Appl. No.: 11/114,956

(22) Filed: Apr. 26, 2005

(65) Prior Publication Data

US 2005/0252968 A1 Nov. 17, 2005

(30) Foreign Application Priority Data

Apr. 28, 2004 (JP) ............................. 2004-134513

(51) Int. Cl.
*G08B 13/14* (2006.01)
(52) U.S. Cl. ............................... 340/572.7; 340/10.51; 343/824
(58) Field of Classification Search ............. 340/572.1, 340/572.7, 10.1, 10.51; 343/824–826; 400/76
See application file for complete search history.

(56) References Cited

U.S. PATENT DOCUMENTS

| 5,929,760 | A | 7/1999 | Monahan | |
| 6,104,291 | A | 8/2000 | Beauvillier et al. | |
| 6,327,972 | B2 * | 12/2001 | Heredia et al. | ............... 400/76 |
| 2004/0178267 | A1 | 9/2004 | Tsirline et al. | |
| 2005/0045723 | A1 | 3/2005 | Tsirline et al. | |
| 2005/0058483 | A1 * | 3/2005 | Chapman et al. | ............. 400/76 |

FOREIGN PATENT DOCUMENTS

| JP | 06-069715 A | 3/1994 |
| JP | 11-345287 A | 12/1999 |
| JP | 2000-105800 A | 4/2000 |
| JP | 2001-096814 A | 4/2001 |
| JP | 2001-331768 A | 11/2001 |
| JP | 2003-076947 A | 3/2003 |
| JP | 2003-132330 A | 5/2003 |
| JP | 2003-338705 A | 11/2003 |
| WO | WO 99/21144 A1 | 4/1999 |

\* cited by examiner

*Primary Examiner*—Thomas Mullen
(74) *Attorney, Agent, or Firm*—Frishauf, Holtz, Goodman & Chick, P.C.

(57) ABSTRACT

An RF tag reader/writer is provided which includes a conveyance plate including a conveyance surface for conveying a paper containing an RF tag, and an antenna having a radiation element. The radiation element is positioned such that the RF tag provided in the paper conveyed on the conveyance surface passes over the radiation element, and a communication section transmits and receives radio waves to and from the RF tag through the antenna to execute data communication with the RF tag. A radio wave passage is provided in the conveyance plate at a position corresponding to the antenna such that the radio waves between the antenna and the RF rag pass through the radio wave passage.

17 Claims, 6 Drawing Sheets

RF TAG READER/WRITER AND PRINTER CONTAINING THE RF TAG READER/WRITER

CROSS-REFERENCE TO RELATED APPLICATION

The present application is based on and claims the benefit of the priority of Japanese Patent Application P2000-134513 filed on Apr. 28, 2004, the entire contents of which are incorporated herein by reference.

BACKGROUND OF THE INVENTION

1. Field of the Invention

The present invention relates to a RF tag reader/writer for reading and writing of a RF tag.

2. Description of Related Art

A technology called RFID (Radio Frequency Identification) is currently widely popular. A RF tag also called an IC tag is used in an application of the RFID. A RF tag can be read and data can be written thereto without contact by use of radio waves. Reading and writing of a RF tag is possible even if the tag itself is hidden.

A label type RF tag contained in a printable label is known. A RF tag label printer which is capable of reading and writing information on a label type RF tag by radio communication and which is capable of printing on a surface of a label containing the RF tag therein is described in Japanese Patent Laid-Open Publication No. 2001-96814. A device having a function of reading and writing information on a RF tag by radio communication is a RF tag reader/writer.

Currently, an internal space of a label printer has been made smaller due to miniaturization of the label printer. Thus, when a RF tag reader/writer is contained in a miniaturized label printer, the RF tag reader/writer tends to be located near a conveyance plate having a conveyance surface for conveying a paper. In some instances, the conveyance plate may stand between the RF tag reader/writer and the RF tag. Since the conveyance plate is often made of metal, a radio wave used in radio communication is susceptible to the metal. Thus when the conveyance plate is positioned between the RF tag reader/writer and the RF tag, there is a problem that the communication between the RF tag reader/writer and the RF tag may be impeded because a radio wave being transmitted to and received by an antenna of the RF tag reader/writer is shielded by the conveyance plate.

An object of the present invention is to enable effective communication between a RF tag reader/writer and a RF tag.

Another object of the present invention is to miniaturize the RF tag reader/writer.

SUMMARY OF THE INVENTION

According to the present invention, a RF tag reader/writer is provided which includes: (i) a conveyance plate including a conveyance surface for conveying a paper containing a RF tag, (ii) an antenna having a radiation element wherein the radiation element is positioned such that the RF tag provided in the paper conveyed on the conveyance surface passes over the radiation element, and (iii) a communication section for transmitting and receiving radio waves to and from the RF tag through the antenna so as to execute data communication with the RF tag. In addition, a radio wave passage is provided in the conveyance plate at a position corresponding to the antenna such that the radio waves between the antenna and the RF tag pass through the radio wave passage.

In addition, according to the present invention, a printer is provided which includes a paper conveyer for conveying a paper containing a RF tag, a printing member for printing on the paper, and the RF tag reader/writer according to the present invention to read and write information on the RF tag provided in the paper conveyed by the paper conveyer.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

An embodiment of the present invention will be described with reference to FIG. 1 to FIG. 7. A printing apparatus according to this embodiment of the present invention is applied to a label printer.

Figure 1:
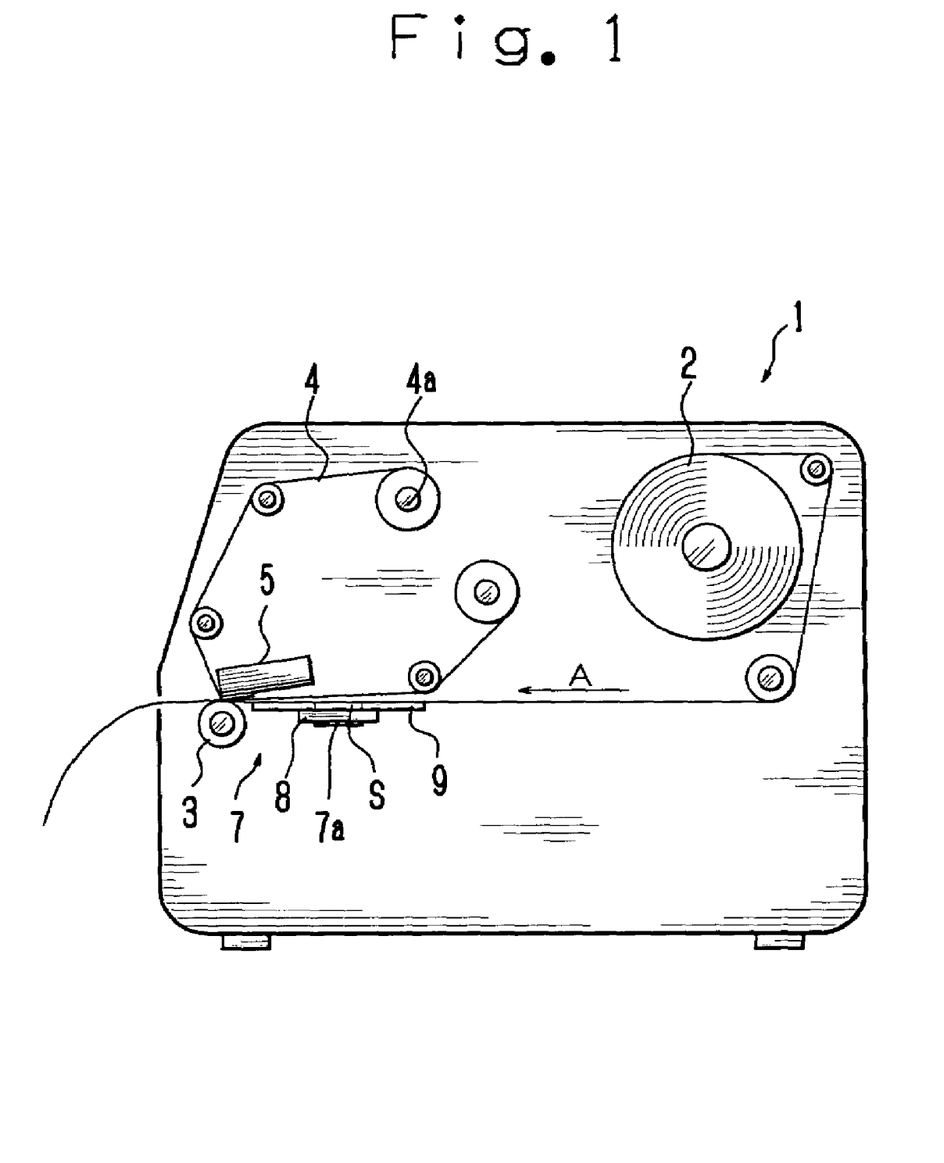
FIG. 1 is a side view in vertical section schematically showing structure of a label printer according to an embodiment of the present invention.

FIG. 1 is a side view in vertical section schematically showing a structure of a label printer 1. As shown in FIG. 1, a platen roller 3 pulls out a label paper 2 which is rolled about a reel shaft 2c (see FIG. 3) and conveys the label paper 2 in a conveying direction A. An ink ribbon 4 and a thermal head 5, which is a printing head for printing a predetermined matter through the ink ribbon 4 on the label paper 2 pulled out from the roll, are disposed opposite to the platen roller 3. The thermal head 5 includes many resistance heating elements (not shown) arranged in a line. The ink ribbon 4 is disposed to contact the thermal head 5 with pressure so that the ink ribbon 4 presses the label paper 2 against the platen roller 3.

In the label printer 1, a RF tag reader/writer 7 is provided for writing or reading information on a RF tag T (shown in FIG. 4) provided in the label paper 2.

A transmitter/receiver 7d as a communication section of the RF tag reader/writer 7 for writing or reading information on the RF tag T (shown in FIG. 4) is provided (not shown).

Figure 2:
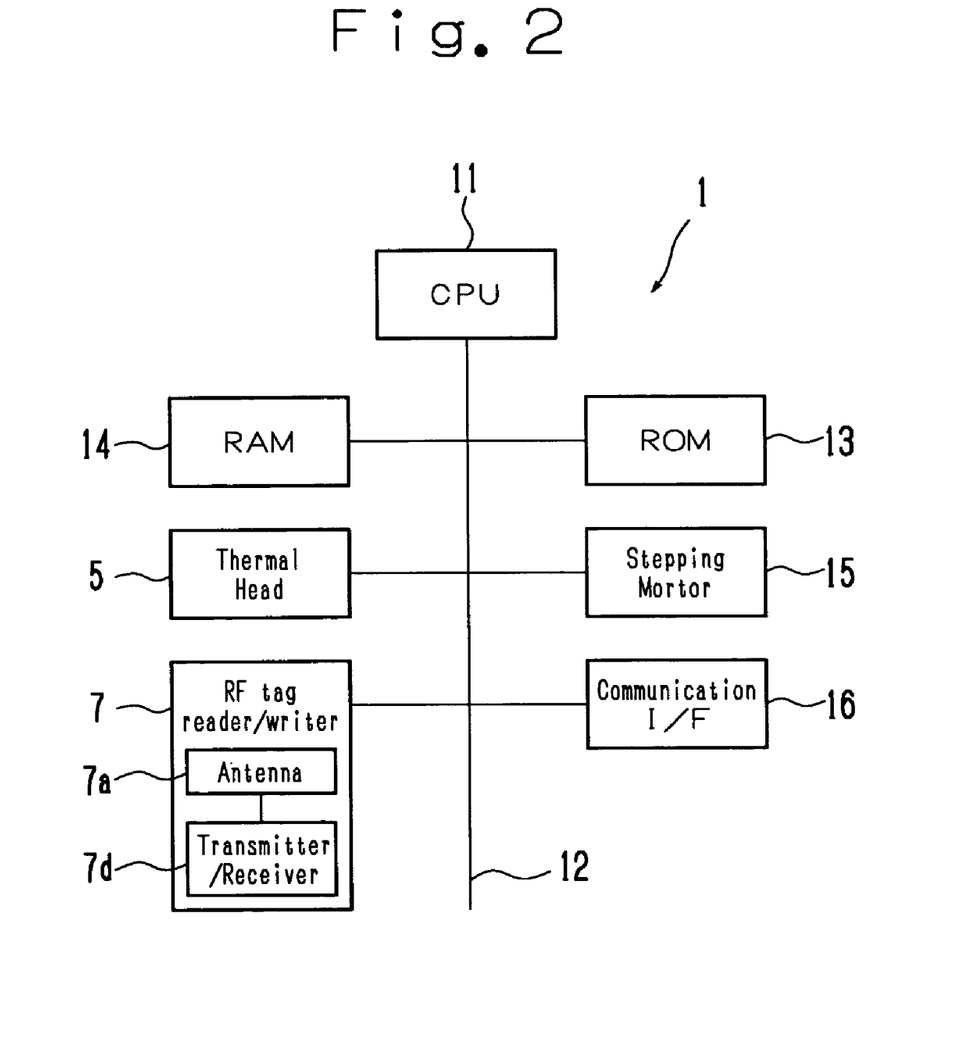
FIG. 2 is a block diagram showing an electrical connection of each part of the label printer according to the embodiment of the present invention.

FIG. 2 is a block diagram showing an electrical connection of each part of the label printer 1. In the label printer 1, a CPU 11 for controlling each part intensively is provided in the label printer 1 as shown in FIG. 2. A ROM 13 comprising a flash memory is connected to a system bus 12 from the CPU 11. Various programs for operating the label printer 1 are stored in the ROM 13. That is, the ROM 13 is a storage medium to store programs. In addition, a RAM 14 which is a storing part functioning as a working area for various operation such as retrieving the programs stored in the ROM 13 is also connected to the system bus 12 from the CPU 11. CPU 11 executes various types of processing according to the programs stored in the ROM 13 while utilizing the RAM 14 as a working area. A thermal head 5, a RF tag reader/writer 7, a stepping motor 15 for conveying the ink ribbon 4 while conveying the label paper 2 by rotating the platen roller 3, and a communication interface (I/F) 16 for inputting data to be stored on the RF tag T or printing data output from an external device are also connected to the system bus 12 from the CPU 11.

Figure 3:
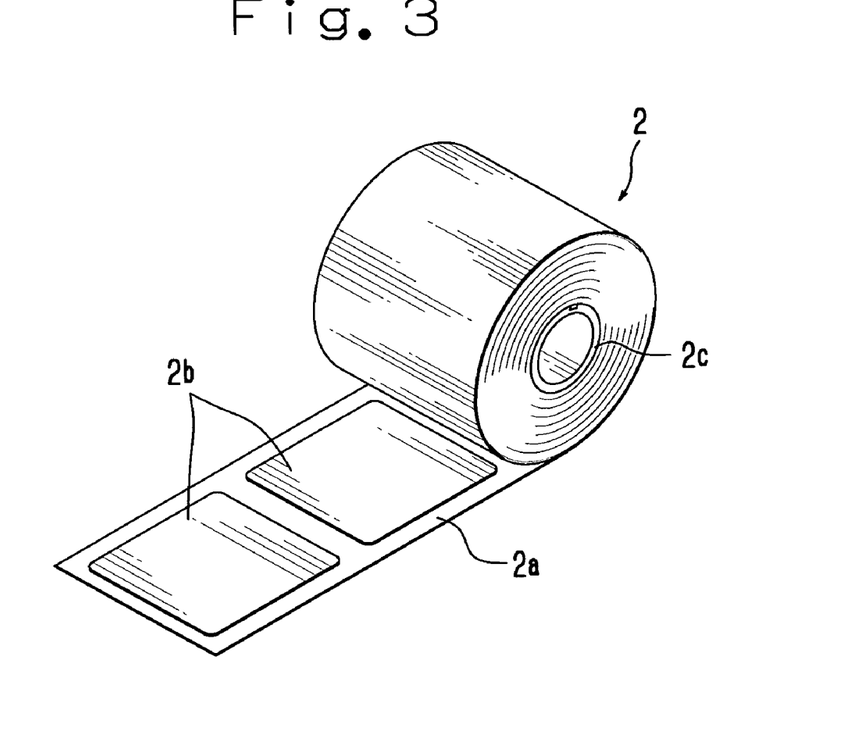
FIG. 3 is a perspective view of a label paper used in the label printer according to the embodiment of the present invention.
Figure 4:
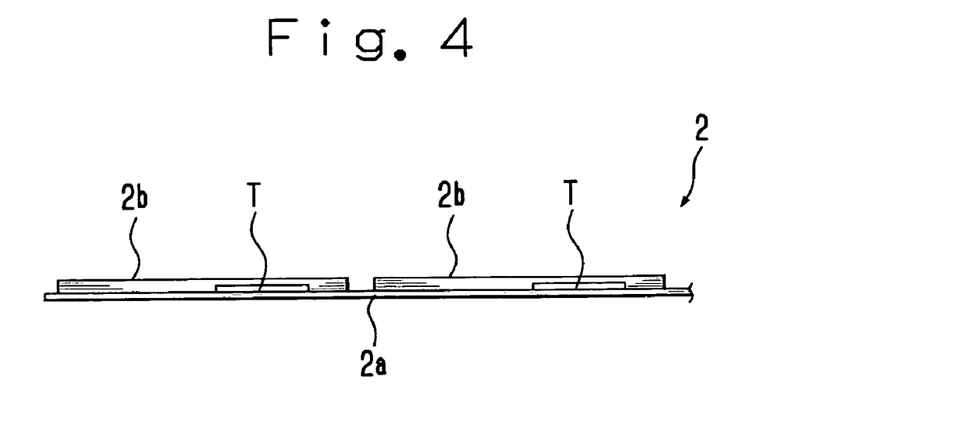
FIG. 4 is a cross-sectional view of the label paper used in the label printer according to the embodiment of the present invention.

The label paper 2 used in the label printer 1 will now be described with respect to FIGS. 3 and 4. FIG. 3 is a perspective view showing the label paper 2, and FIG. 4 is a cross-sectional view showing the label paper 2. As shown in FIG. 3, the label paper 2 has many printing labels 2b on a base paper 2a. As shown in FIG. 4, a RF tag T is embedded in the printing label 2b held on the label paper 2. The RF tag T and the printing label 2b are integral and are removable from the base paper 2a after printing to be affixed on an object. The RF tag T is used for RFID and is also called an IC tag. The RF tag T, which is not shown in detail, mainly comprises an IC chip including a storing part for storing ID data or other data and an antenna capable of transmitting data by radio communication. Electrostatic coupling type, electromagnetic coupling type, electromagnetic induction type, microwave type or other type can be applied to communication type between the RF tag reader/writer and the RF tag.

A basic processing operation by CPU 11 of the label printer 1 will now be described. CPU 11 executes printing on the printing label 2b of the label paper 2 in the main scanning direction by selectively electrically heating the resistance heating elements arranged in a line in the thermal head 5 in accordance with printing data which is input through the communication I/F 16 so as to melt or sublime an ink of the ink ribbon 4. CPU 11 also executes printing in the sub scanning direction by moving the label paper 2 with respect to the thermal head 5 in the conveying direction A (shown in FIG. 1) by rotating of the platen roller 3, which is driven by the stepping motor 15. CPU 11 rotates and drives the ink ribbon 4 by a drive force of the stepping motor 15 and rolls up used ink ribbon 4 on a reel shaft 4a. Thus, a printing part of the label printer of the present invention comprises the platen roller 3, the ink ribbon 4 and the thermal head 5, and a conveying mechanism comprises the platen roller 3 and the stepping motor 15.

The label paper 2, which is conveyed in the conveying direction A (shown in FIG. 1) for printing, passes above a slit S of the conveyance plate 9 while being conveyed. CPU 11 writes data which is input through the communication I/F 16 on the RF tag T embedded in the printing label 2b by the RF tag reader/writer 7 when the RF tag passes above the slit S in the conveyance plate 9.

The RF tag reader/writer 7 and a structure arranged proximately thereto will now be described in detail.

Figure 5:
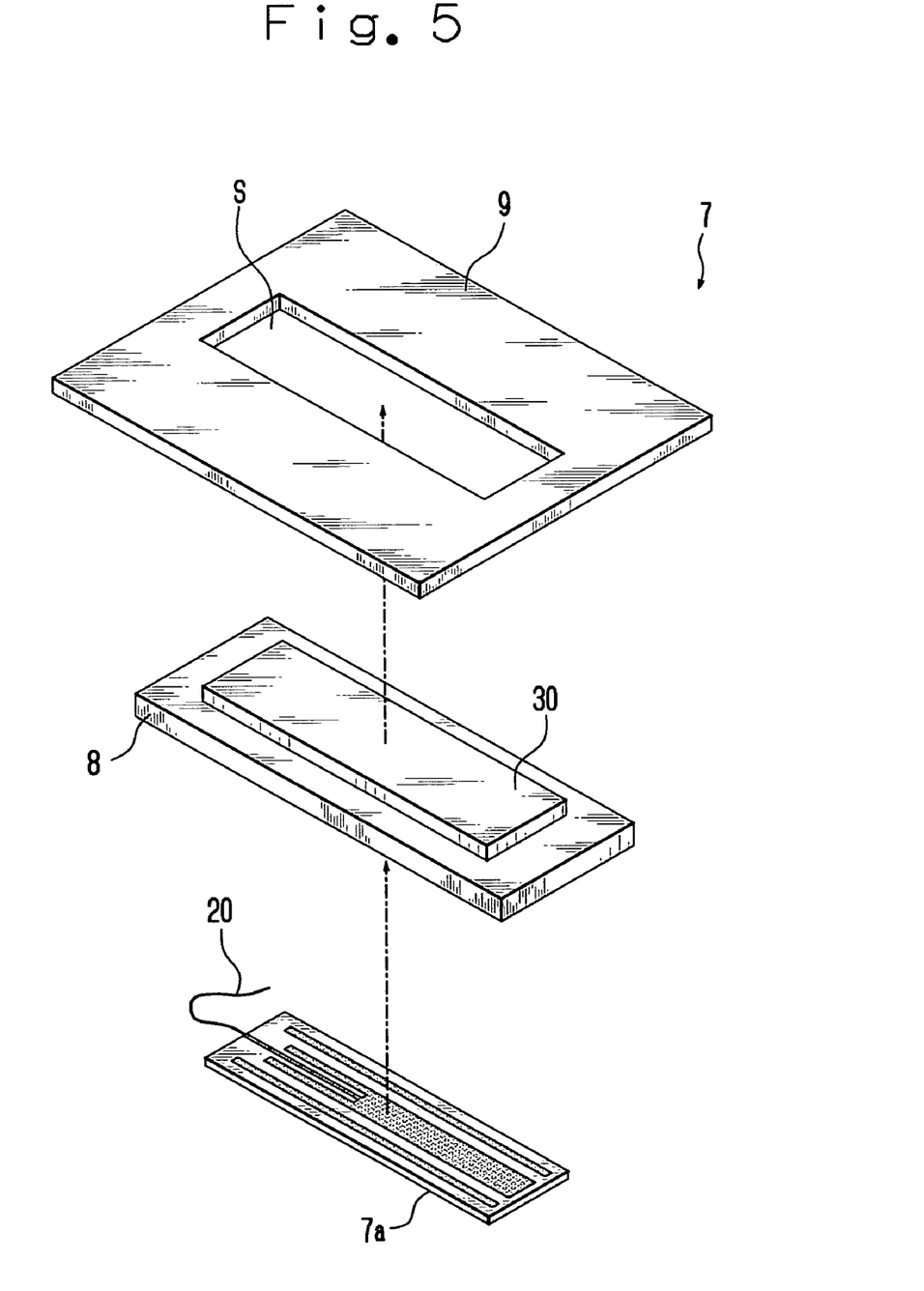
FIG. 5 is an exploded perspective view showing a structure near the RF tag reader/writer.

FIG. 5 is an exploded perspective view showing a structure near a RF tag reader/writer 7. As shown in FIG. 5, a dielectric component 8 and the conveyance plate 9 are disposed on the antenna 7a of the RF tag reader/writer. The antenna 7a, the dielectrics component 8 and the conveyance plate 9 can be integrally formed as the RF tag reader/writer, or the dielectrics component 8 and the conveyance plate 9 can be arranged later on the antenna 7a of the RF tag reader/writer 7.

Figure 6:
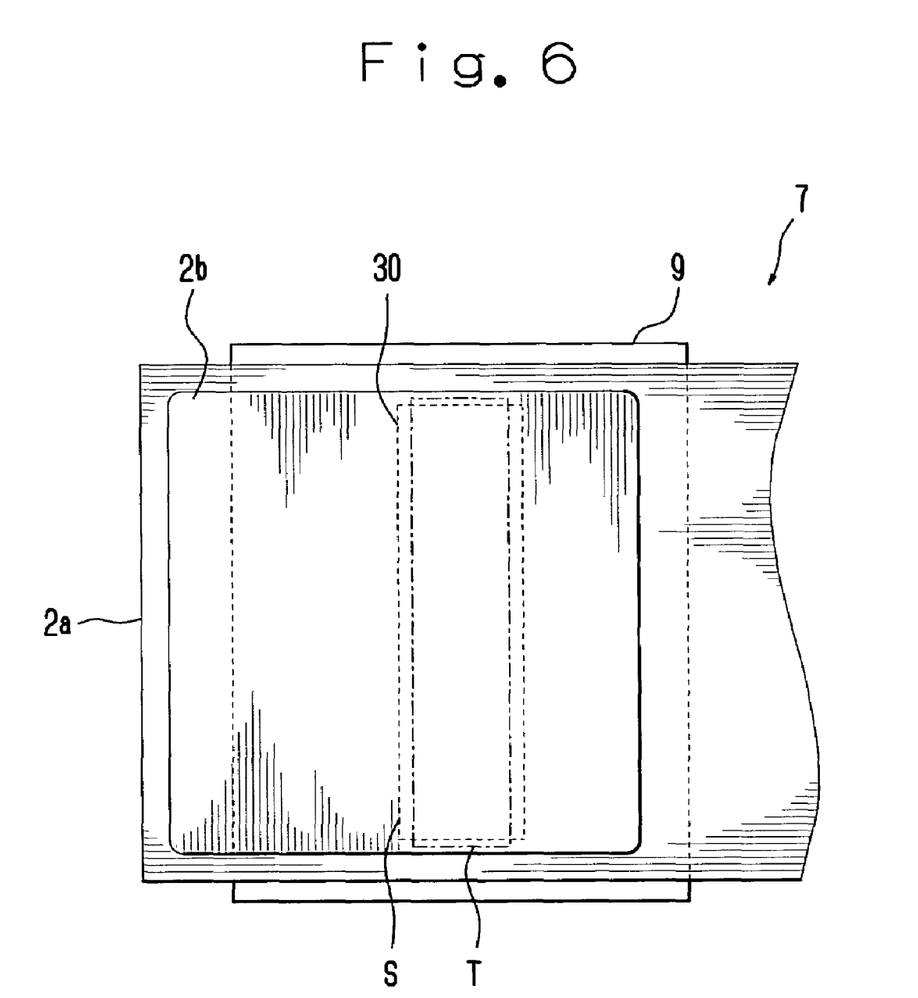
FIG. 6 is a plan view showing a relationship between the conveyance plate and the RF tag on the label paper.

FIG. 6 is a plan view showing a relationship between the conveyance plate 9 and the RF tag T in the label paper 2. As shown in FIG. 6, the base paper 2a of the label paper 2 is conveyed on the conveyance surface of the conveyance plate 9. A slit S as a radio wave passage is formed in an approximately central portion of the conveyance plate 9. A longitudinal direction of the antenna 7a and the slit S is approximately perpendicular to the conveying direction A of the label paper 2. The antenna 7a is disposed under the dielectric component 8 below the slit S. The antenna 7a is arranged in a location opposite to an area where the RF tag T passes, and transmits and receives radio waves. The antenna 7a has a directivity towards the RF tag T in the label paper 2 in such a direction that an output radio wave is stronger.

Figure 7:
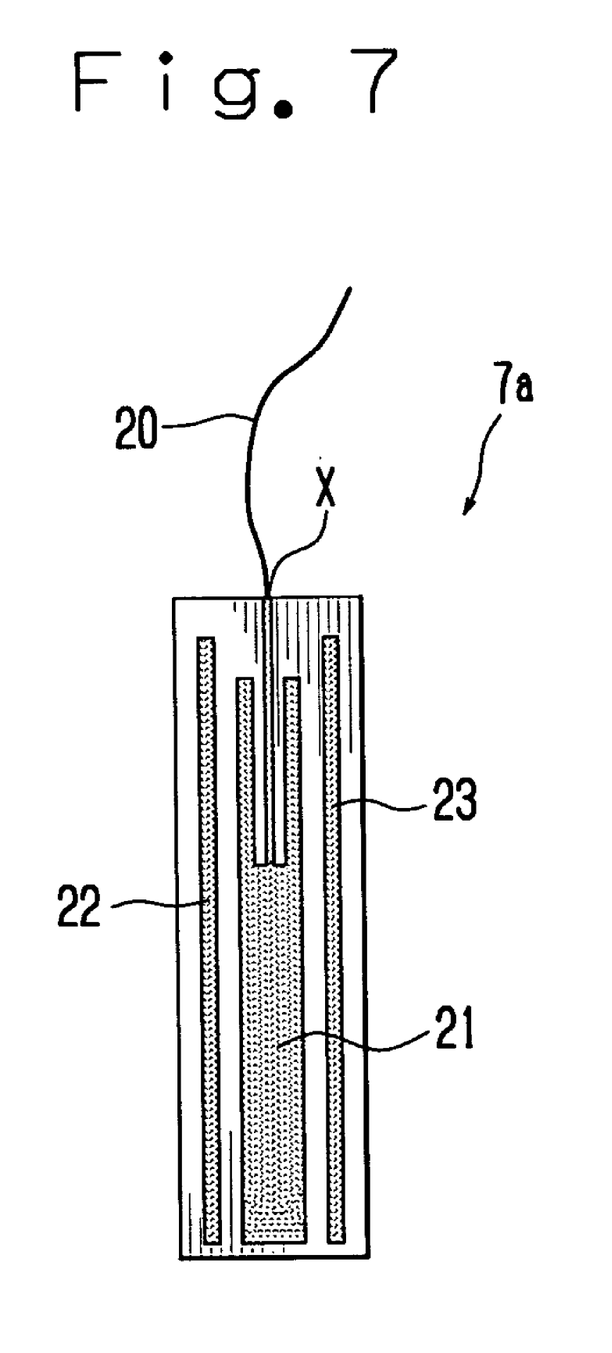
FIG. 7 is a plan view showing a shape of an antenna of the RF tag reader/writer.

FIG. 7 is a plan view showing a shape of an antenna of the RF tag reader/writer. As shown in FIG. 7, the antenna 7a of the RF tag reader/writer 7 comprises a circuit board. The shaded portion in FIG. 7 is a copper foil pattern. The entire back side of the antenna 7a is ground, and the antenna 7a outputs radio waves strongly in the direction of coming out of the sheet of FIG. 7. A core of coaxial cable 20 is connected to a feeding point X at an end of the pattern of the surface of the antenna 7a, and an external conductor of the coaxial cable 20 is connected to the backside ground. The other end of the coaxial cable 20 is connected to the transmitter/receiver 7d (shown in FIG. 2) which controls radio communication and other functions. When a high frequency wave provided from the feeding point X is radiated from a first radiation element 21 to the air as a radio wave, the high frequency wave excites a second radiation element 22 and a third radiation element 23 arranged parallel with the first radiation element 21. In the antenna 7a of the embodiment of the present invention, lengths of the second radiation element 22 and the third radiation element 23 are longer than that of the first radiation element 21, and the second radiation element 22 and the third radiation element 23 resonate with a lower frequency than the first radiation element 21 does. Accordingly, a range of frequencies of the antenna 7a can be broadened. The range of frequencies can be further broadened by increasing a number of radiation elements having different lengths. The influence of objects around the antenna 7a can be reduced by broadening a ground part of the antenna 7a.

It becomes difficult to broaden the range of frequencies when a width of an area where the radiation elements are arranged in the conveying direction A is wider than a width of the slit S of the conveyance plate 9, such that the radiation elements and a metal portion of the conveyance plate 9 overlap. It is therefore preferable for the radiation elements and the slit S to have a similar width and shape, and for the ground and the conveyance plate 9 to have a similar width to make the external shape of the antenna 7a broader than that of the slit S of the conveyance plate 9.

A projection 30 is formed in the approximately central portion of the dielectric component 8 which is arranged below the conveyance plate 9. The projection 30 is inserted into the slit S of the conveyance plate 9 from below. When the dielectric component 8 is pressed into the conveyance plate 9 from below, an upper surface of the projection 30 and an upper surface of the conveyance plate 9 are in the same plane. The upper surface of the projection 30 therefore forms the conveyance surface of the base paper 2a of the label paper 2 in a similar way as the upper surface of the conveyance plate 9.

The structure explained above serves to eliminate an uneven conveyance surface of the base paper 2a of the label paper 2 and to prevent the base paper 2a of the label paper 2 from jamming and from winding.

A radio wave has a property that its wavelength in the dielectric component 8 is shorter than its wavelength in free space. Generally, the wavelength λ in the dielectrics component 8 is expressed as the following formula (1);

$$\lambda = \lambda_0 / \sqrt{\mu_R \epsilon_R} \quad (1)$$

Here, $\lambda_0$ is a wavelength in free air, $\mu_R$ is relative permeability, and $\epsilon_R$ is relative permittivity. Usually, relative permeability $\mu_R$ is 1, thus the wavelength λ is shorter as the relative permittivity $\epsilon_R$ is higher. When a component having a high relative permittivity $\epsilon_R$ is used as the dielectrics component 8, the longitudinal length of the antenna 7a of the RF tag reader/writer can be shorter so that the antenna 7a can be miniaturized.

The RF tag reader/writer having the structure described above radiates a transmission signal from the transmitter/receiver 7d as a radio wave from the antenna 7a. Also, the RF tag reader/writer 7 transmits a signal to the transmitter/receiver 7d when the RF tag reader/writer 7 receives a radio wave from the RF tag T by the antenna 7a and the transmitter/receiver 7d extracts information from the received signal.

According to the RF tag reader/writer of the embodiment of the present invention, a radio wave radiated from the antenna 7a passes the slit S of the conveyance plate 9 and arrives at the RF tag T provided in the printing label 2b of the label paper 2 passing over the slit S. Further, since the radio wave radiated from the RF tag T passes through the slit S to arrive at the antenna 7a, the communication with the RF tag T can be performed effectively.

According to the RF tag reader/writer of the embodiment of the present invention, by arranging a plurality of radiation elements having different lengths to broaden the range of frequencies of the antenna, effective communication can be achieved even if a frequency range used in radio communication is wide or various frequencies are used.

In addition, according to the RF tag reader/writer of the embodiment, by arranging the dielectrics component 8 on the antenna 7a, the longitudinal length of the antenna 7a of the RF tag reader/writer can be decreased.

The embodiment of the present invention is described in conjunction with a specific structure in which the dielectric component 8 is inserted into the slit S of the conveyance plate 9, but the present invention is not limited to this structure. The internal part of the slit S can be the air, that is, can be an air layer instead of the dielectrics component 8. In this case it is preferable that the shape of the slit S is similar to the shape of the antenna of the RF tag T as much as possible because the base paper 2a of the label paper 2 is apt to jam on if the width of the slit S is broad.

Obviously, numerous modifications and variations of the present invention are possible in light of the above teachings. It is therefore to be understood that within the scope of the appended claims, the invention may be practiced otherwise than as specifically described herein.

What is claimed is:

1. A RF tag reader/writer, comprising:
a conveyance plate including a conveyance surface for conveying a paper containing a RF tag in a paper conveying direction;
an antenna having a front surface facing toward the paper conveyed by the conveyance plate, and a back surface facing away from the paper conveyed by the conveyance plate, at least one radiation element being positioned on the front surface such that the RF tag provided in the paper conveyed on the conveyance surface passes over the radiation element, and all of the back surface being grounded;
a communication section for transmitting and receiving radio waves to and from the RF tag through the antenna so as to execute data communication with the RF tag; and
a radio wave passage provided in the conveyance plate at a position corresponding to the antenna such that the radio waves between the antenna and the RF tag pass through the radio wave passage;
wherein a width along the paper conveying direction of an area over which the at least one radiation element is provided on the front surface of the antenna is not larger than a width of the radio wave passage along the paper conveying direction, and wherein a width of the antenna along the paper conveying direction is larger than the width of the radio wave passage along the paper conveying direction.

2. The RF tag reader/writer according to claim 1, wherein the at least one radiation element comprises a plurality of radiation elements and at least two of the radiation elements have different lengths.

3. The RF tag reader/writer according to claim 1, wherein longitudinal directions of the antenna and the radio wave passage are substantially perpendicular to the paper conveying direction.

4. The RF tag reader/writer according to claim 1, wherein the antenna has a directivity towards the RF tag provided in the paper conveyed on the conveyance plate.

5. The RF tag reader/writer according to claim 1, further comprising a dielectric component inserted in the radio wave passage of the conveyance plate.

6. The RF tag reader/writer according to claim 5, wherein an upper surface of the dielectric component inserted in the radio wave passage is in a same plane as the conveyance surface of the conveyance plate.

7. The RF tag reader/writer according to claim 1, wherein the radio wave passage is substantially a same shape as the area over which the at least one radiation element is provided.

8. A printer, comprising:
a paper conveyer for conveying a paper containing a RF tag in a paper conveying direction;
a printing member for printing on the paper; and
a RF tag reader/writer reading and writing information on the RF tag provided in the paper conveyed by the paper conveyer, the RF tag reader/writer comprising:
a conveyance plate having a conveyance surface for conveying the paper;
an antenna having a front surface facing toward the paper conveyed by the conveyance plate, and a back surface facing away from the paper conveyed by the conveyance plate, at least one radiation element being positioned on the front surface such that the RF tag provided in the paper conveyed on the conveyance surface passes over the radiation element, and all of the back surface being grounded;

a communication section for transmitting and receiving radio waves to and from the RF tag through the antenna so as to execute a data communication with the RF tag; and a radio wave passage provided in the conveyance plate at a position corresponding to the antenna such that the radio waves between the antenna and the RF tag pass through the radio wave passage;

wherein a width along the paper conveying direction of an area over which the at least one radiation element is provided on the front surface of the antenna is not larger than a width of the radio wave passage along the paper conveying direction, and wherein a width of the antenna along the paper conveying direction is larger than the width of the radio wave passage along the paper conveying direction.

9. The printer according to claim 8, wherein the at least one radiation element comprises a plurality of radiation elements and at least two of the radiation elements have different lengths.

10. The printer according to claim 8, wherein longitudinal directions of the antenna and the radio wave passage are substantially perpendicular to the paper conveying direction.

11. The printer according to claim 8, wherein the antenna has a directivity towards the RF tag provided in the paper conveyed on the conveyance plate.

12. The printer according to claim 8, wherein the RF tag reader/writer further comprises a dielectric component inserted in the radio wave passage of the conveyance plate.

13. The printer according to claim 12, wherein an upper surface of the dielectric component inserted in the radio wave passage is in a same plane as the conveyance surface of the conveyance plate.

14. The printer according to claim 8, wherein the radio wave passage is substantially a same shape as the area over which the at least one radiation element is provided.

15. A RF tag reader/writer, comprising:

a conveyance plate including a conveyance surface for conveying a paper containing a RF tag;

an antenna including a plurality of radiation elements, the radiation elements being positioned such that the RF tag provided in the paper conveyed on the conveyance surface passes over the radiation elements;

a communication section for transmitting and receiving radio waves to and from the RF tag through the antenna so as to execute data communication with the RF tag; and a radio wave passage provided in the conveyance plate at a position corresponding to the antenna such that the radio waves between the antenna and the RF tag pass through the radio wave passage;

wherein at least two of the radiation elements have different lengths.

16. The RF tag reader/writer according to claim 15, wherein the radio wave passage has substantially a same shape as an external shape of the antenna, and has substantially a same size as the antenna.

17. The RF tag reader/writer according to claim 15, wherein the radio wave passage is slightly smaller than the antenna.

* * * * *